United States Patent [19]

Vautrain et al.

[11] 4,021,201
[45] May 3, 1977

[54] CONTROL SYSTEM FOR SULFUR PROCESS

[75] Inventors: Lucien H. Vautrain; Herbert A. Ems, both of Sweeny, Tex.

[73] Assignee: Phillips Petroleum Company, Bartlesville, Okla.

[22] Filed: July 1, 1976

[21] Appl. No.: 701,726

Related U.S. Application Data

[62] Division of Ser. No. 526,939, Nov. 25, 1974, Pat. No. 3,985,864.

[52] U.S. Cl. .......................... 23/253 A; 23/255 R; 23/254 R; 423/574 R; 235/151.12
[51] Int. Cl.$^2$ ......................................... C01B 17/04
[58] Field of Search ............. 235/151.12; 23/254 R, 23/253 A, 232 R, 255 R, 253 PC, 230 A; 423/573, 574, 576, 659

[56] References Cited

UNITED STATES PATENTS

| | | | |
|---|---|---|---|
| 2,650,154 | 8/1953 | Anderson | 423/574 |
| 3,312,529 | 4/1967 | Evano | 423/574 X |
| 3,424,560 | 1/1969 | Carmassi et al. | 423/567 X |
| 3,871,831 | 5/1975 | Andral et al. | 423/573 X |

OTHER PUBLICATIONS

Opekar et al., "The Oil & Gas Journal," May 2, 1966, pp. 86–89.

Primary Examiner—R.E. Serwin

[57] ABSTRACT

The flow rate of the oxygen-containing gas to a process for the oxidation of the hydrogen sulfide in a sour gas to sulfur is regulated responsive to the lower of the sour gas pressure signal and a signal representing the value of the sour gas flow rate as modified by the ratio of hydrogen sulfide to sulfur dioxide in the gaseous reaction effluent, to maintain the desired ratio of hydrogen sulfide to oxygen fed to the process. The sour gas flow rate can be regulated responsive to the higher of the sour gas pressure signal and the oxygen-containing gas flow rate signal.

10 Claims, 1 Drawing Figure

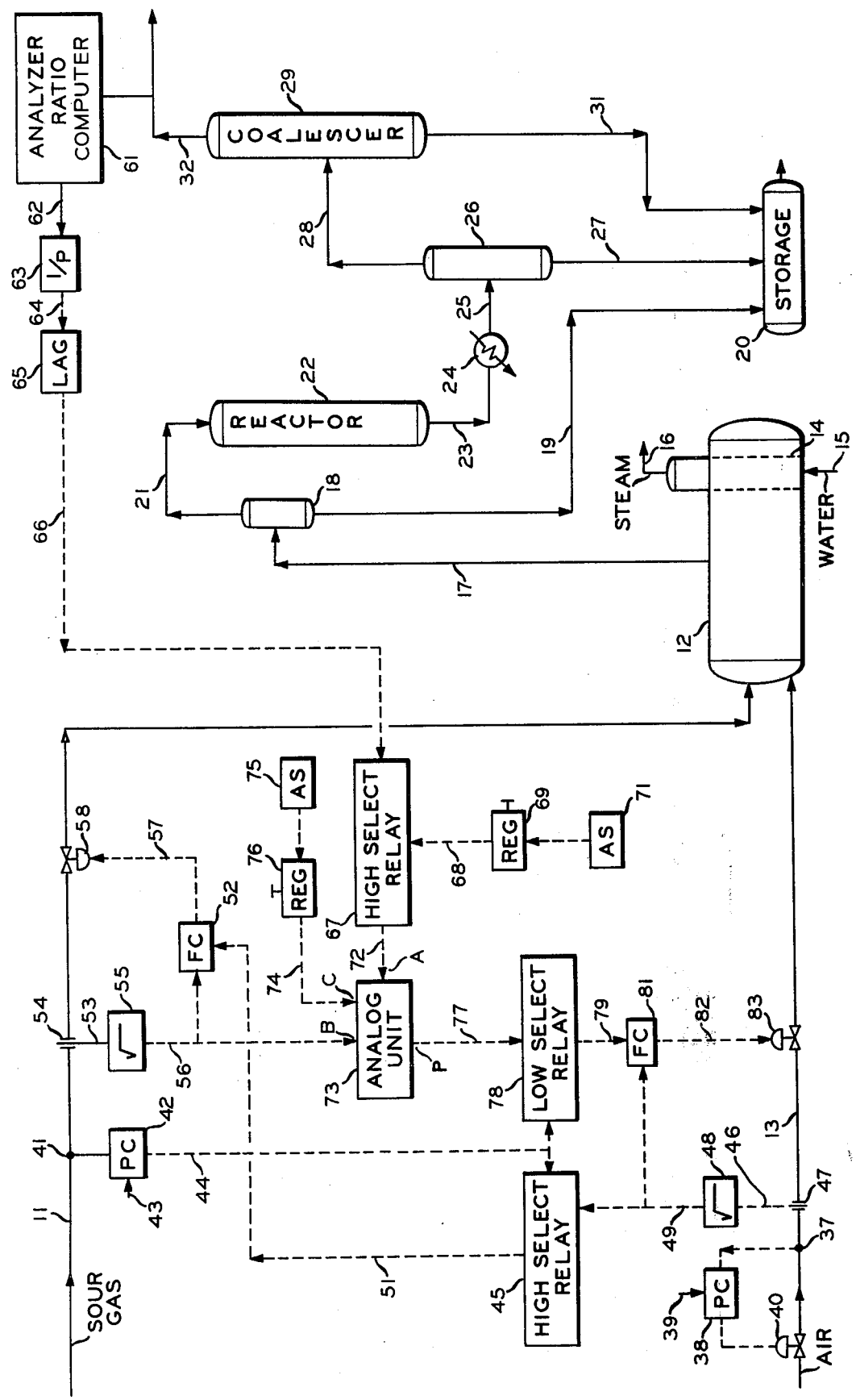

CONTROL SYSTEM FOR SULFUR PROCESS

This is a division of our copending application Ser. No. 526,939, filed on Nov. 25, 1974, now U.S. Pat. No. 3,985,864.

This invention relates to the production of sulfur from hydrogen sulfide. In a specific aspect the invention relates to a control system for a process for oxidizing hydrogen sulfide to sulfur.

In the stoichiometric control of the mixing of a sour gas and an oxygen-containing gas in a process for the oxidation of the hydrogen sulfide content of the sour gas to elemental sulfur, we have five basic objectives. The first objective is to maintain the quantity of oxygen below that stoichiometrically required for the oxidation of the hydrogen sulfide in order to prevent the formation of sulfates in the process effluent. The production of sulfates in the gaseous effluent can cause operating problems in downstream processing equipment. The second objective is to maintain the oxygen quantity as close as possible to the stoichiometrical requirement in order to promote the highest possible efficiency in oxidizing the sour gas and to reduce the sulfur content of the gaseous effluent from the process. The third objective is to maintain stable control of the process while achieving the first two objectives even though the sour gas flow rate may vary. The fourth objective is to maintain stable control of the process while achieving the first two objectives even though the hydrogen sulfide content of the sour gas may vary. The fifth objective is to effect stable control of the process while achieving the first four objectives even though there is a time delay between the ocurrence of a variation in one or both of the process feed streams and the occurrence of the measurement of the effect of that variation on the gaseous effluent from the process. Other objects, aspects and advantages of the invention will be apparent from a study of the specification, the drawing and the appended claims to the invention.

In the drawing, the single FIGURE is a schematic representation of a system for producing sulfur from hydrogen sulfide in accordance with one embodiment of the present invention.

Sour gas, comprising a significant concentration of hydrogen sulfide, is passed through conduit 11 to the fuel inlet of boiler 12. A suitable oxygen-containing gas, such as air, is passed through conduit 13 to the air inlet of boiler 12. Water is introduced into an enclosed chamber 14 in boiler 12 by way of conduit 15. The water in chamber 14 is in indirect heat exchange relationship with the hot combustion gases resulting from the reaction in the boiler 12 of the oxygen and the hydrogen sulfide being fed to the boiler by way of conduits 13 and 11, respectively. Thus, the water in chamber 14 is converted into steam, which is withdrawn by way of conduit 16. The formation of the steam in chamber 14 results in the cooling of the hot combustion gases within boiler 12. The combustion products from boiler 13 normally comprise sulfur dioxide, unreacted hydrogen sulfide, water vapor, carbon dioxide, nitrogen, and a small amount of sulfur. These combustion products are withdrawn from the boiler 12 and passed via conduit 17 into phase separator 18 for the separation of the liquid sulfur therefrom. The separated liquid sulfur is passed via conduit 19 into sulfur storage 20, while the gaseous combustion products are passed via conduit 21 into reactor 22. The sulfur dioxide is reacted with the hydrogen sulfide in reactor 22 to form sulfur. Reactor 22 can contain any suitable catalyst known in the art, for example, bauxite. The hot reaction effluent from reactor 22 is passed through conduit 23, cooler 24 and conduit 25 into phase separator 26. Liquid sulfur is withdrawn from phase separator 26 and passed via conduit 27 into sulfur storage 20. The remaining gaseous effluent is withdrawn from separator 26 and passed via conduit 28 into coalescer 29. Liquid sulfur is withdrawn from the bottom portion of coalescer 29 and passed via conduit 31 into storage 20, while the stripped gas is withdrawn from coalescer 29 via conduit 32.

The pressure of the air in conduit 13 is measured by a pressure sensor 37 and a signal representative of the thus measured pressure is applied to the measurement input of pressure controller 38. A signal 39, representing the desired air pressure in conduit 13, is applied to the setpoint input of controller 38. The output of controller 38 is responsive to the difference between the measurement signal and the setpoint signal and is applied to the control input of motor valve 40, operatively connected in conduit 13 upstream of sensor 37.

The pressure of the sour gas in conduit 11 is measured by sensor 41 and a signal representative of the thus measured pressure is applied to the measurement input of pressure controller 42. Controller 42 compares the pressure measurement signal with a setpoint signal 43, representing the desired sour gas pressure, and produces an output signal 44 responsive to the difference between the measured pressure and the desired pressure. Signal 44 is applied to one input of high select relay 45.

A signal 46 representative of the square of the flow rate of air through conduit 13 is produced by an orifice meter 47, located in conduit 13 downstream of valve 40, and passed to square root extractor 48. The output signal 49 from square root extractor 48 is proportional to the flow rate of air in conduit 13, and is applied to the second input of high select relay 45. Relay 45 compares the two input signals 44 and 49 applied thereto and passes the higher of the two as output signal 51, which is then applied to the setpoint input of flow controller 52. A signal 53 representative of the square of the flow rate of sour gas through conduit 11 is produced by an orifice meter 54 and passed to square root extractor 55. The output signal 56 from square root extractor 55 is proportional to the flow rate of sour gas in conduit 11, and is applied to the measurement input of flow controller 52. Controller 52 compares the measurement input signal 56 and the setpoint signal 51 and produces an output signal 57 responsive to the difference between the measurement input signal 56 and the setpoint signal 51. The output signal 57 is applied to the control input of motor valve 58 which is operatively connected in conduit 11 downstream of pressure sensor 41.

An analyzer ratio computer 61 is operatively connected to conduit 32 to obtain a series of samples of the gases flowing through conduit 32, analyze each sample for the concentration therein of hydrogen sulfide and of sulfur dioxide, and produce an output signal 62 representative of the ratio of the concentration of hydrogen sulfide to the concentration of sulfur dioxide in the current sample. Ratio signal 62, which is in electrical form, is applied to current-to-pressure transducer 63 to produce a pneumatic signal 64 representative of the current ratio. The signal 64 is applied to lag device 65 to smooth out the abrupt changes in the ratio signal 64.

The resulting lagged signal 66 is applied to one input of high select relay 67. A manually regulatable air pressure signal 68, provided by pressure regulator 69 and air supply 71, is applied to the second input of high select relay 67. Relay 67 compares signals 66 and 68 and passes the higher thereof as input signal 72 to the A input of analog unit 73. Signal 56, representative of the flow rate of sour gas in conduit 11, is applied to the B input of analog unit 73. A manually regulatable pressure signal 74, provided by air supply 75 and pressure regulator 76, is applied to the C input of analog unit 73. The relationship of output signal 77 of analog unit 73 to the input signals to analog unit 73 is defined by:

$$P = B + K (A-C)$$

wherein
P is the output signal 77,
A is the input signal 72 which is applied to the A input port,
B is the input signal 56 which is applied to the B input port,
C is the input signal 74 which is applied to the C input port, and
K is 100/G, where G is the gain of the analog unit 73. Once the gain of unit 73 is selected, K becomes a constant. The output signal 77 is taken from the P port of analog unit 73 and applied to one input of low select relay 78. The signal 44, responsive to the difference between the measured pressure in conduit 11 and the desired sour gas pressure, is applied to the second input of relay 78. Relay 78 compares signals 44 and 77 and passes the lower thereof as the setpoint signal 79 for flow controller 81. The air flow signal 49 is applied to the measurement input of flow controller 81. The output signal 82 from flow controller 81, which is responsive to the difference between signals 49 and 79, is applied to the control input of motor valve 83 which is operatively connected in conduit 13.

The sour gas flow rate orifice meter 54 and the air flow rate orifice meter 47 can be sized in such a relationship that the pneumatic signal 56 representing the normal flow rate of hydrogen sulfide through conduit 11 (based on the normal, or average concentration of hydrogen sulfide in the sour gas) equals the pneumatic signal 49 for the corresponding flow rate of oxygen through conduit 13 (based on the normal, or average, concentration of oxygen in the oxygen-containing gas passing through conduit 13) necessary to convert the desired portion, generally one-third, of the hydrogen sulfide in the sour gas stream to sulfur dioxide. The bias on pressure controller 42 can also be adjusted so that when the measured pressure equals the desired pressure represented by setpoint signal 43 the pneumatic signal 44 equals the equilibrium values of pneumatic signals 56 and 49. In other words, at equilibrium conditions, signal 72 equals signal 74, signal 77 equals signal 56, and signal 44 equals signal 49 and 77.

Assume that the control system is in equilibrium and then the pressure of the sour gas in conduit 11 increases because of some variable in the source of the sour gas. The increased sour gas pressure will be measured by pressure sensor 41, causing the pneumatic signal 44 to increase over its equilibrium value. At this point in time, signal 44 will be greater than signals 49 and 77, causing low select relay 78 to pass signal 77 to air flow controller 81, and high select relay 45 to pass signal 44 to sour gas flow controller 52. The increase in the setpoint signal 51 to flow controller 52 causes valve 58 to open further, thereby increasing the flow rate of the sour gas. The increased sour gas flow rate is detected by orifice flow meter 54, resulting in an increase in the value of signal 56 being applied to the B input of analog unit 73. Even though the value of signal 77 is increased as a result of the initial increase in sour gas flow rate signal 56, the value of signal 77 will still be lower than the value of signal 44, so that low select relay 78 will continue to pass the increased signal 77 to the setpoint of the air flow controller 81, thereby increasing the air flow rate. The increase in air flow rate is sensed by flow rate orifice meter 46, and the value of signal 49 to high select relay 45 is increased accordingly. In the meantime, the sour gas pressure will decrease as a result of the increased flow rate of sour gas, resulting in a corresponding decrease in sour gas pressure signal 44. This continues until the air flow value signal 49 slightly exceeds sour gas pressure signal 44, thereby causing high select relay 45 to pass the air flow rate signal 49 to the input of sour gas flow controller 52, increasing the flow of sour gas and the value of signal 56 to the point where signal 77 slightly exceeds signal 44, thereby causing low select relay 78 to pass the lower signal 44 to air flow controller 81 to reduce the air flow rate and the corresponding air flow rate signal 49. Thus the system reaches equilibrium at the new, higher values of flow rates of air and sour gas, with signals 44, 77 and 49 again being equal.

If the sour gas pressure decreases because of some variable in the source of sour gas, the opposite actions occur. The sour gas pressure signal 44 will be passed by low select relay 78 to air flow controller 81 to reduce the air flow rate. The decreasing value of the air flow rate signal 49 is passed by high select relay 45 to the sour gas flow controller 52 to decrease the sour gas flow rate accordingly. The decreasing value of the sour gas flow rate signal 56 causes a corresponding decrease in the signal 77. Meanwhile the reduction in sour gas flow rate causes the sour gas pressure to increase. This continues until the system again reaches equilibrium. Thus, the desired ratio of hydrogen sulfide to oxygen is maintained despite changes in sour gas pressure.

If any variation occurs in the hydrogen sulfide concentration in the sour gas stream or in the oxygen concentration in the air stream or both, the resulting change in the ratio of hydrogen sulfide to sulfide dioxide in effluent gas stream 32 is detected by analyzer ratio computer 61 and signal 66 is varied accordingly. Signal 68 is employed as a lower limit for the control range of the measured ratio so that high select relay 67 passes the lagged ratio measurement signal 66 so long as it is above the lower limit of the control range. If the lagged ratio measurement signal 66 equals the signal 74, which represents the desired ratio, the output signal 77 is equal to the sour gas flow rate signal 56. If the lagged ratio measurement signal 66 is greater than signal 74, the output signal 77 of the analog unit 73 will be greater than the sour gas flow rate signal 56, and will also be greater than the sour gas pressure signal 44 if the system is otherwise at equilibrium. Thus, low select relay 78 will pass the sour gas pressure signal 44 to air flow controller 81 to control the air flow rate responsive to the sour gas pressure. However, if the lagged signal 66 representing the measurement of the ratio of hydrogen sulfide to sulfur dioxide becomes less than the value of standard signal 74, the output signal 77 of analog unit 73 will become less than the value of the sour gas flow rate signal 56, and also less than the value of the sour gas pressure signal 44 if the system is otherwise at equilibrium. Low select relay 78 will pass the longer analog unit output signal 77 to air flow controller 81 to reduce the air flow rate until the lagged measured ratio of hydrogen sulfide to sulfur dioxide again equals the desired ratio represented by standard signal 74.

Any suitable components known in the art can be employed to construct the control system of this invention, including electrical components, pneumatic components, mechanical components, and combinations thereof, with either analog or digital output signals. In one embodiment utilizing pneumatic components, other than the electronic analyzer ratio computer, the following components were employed:

pressure controller 42: Foxboro 5422TS58P4 recorder controller
square root extractors 48 and 55: Foxboro 557 square root extractors
flow controllers 52 and 81: Foxboro 5422PS58P4 recorder controllers
relays 45 and 67: Foxboro B-114-YL relays
relay 78: Foxboro B-114-BZ relay
analog unit 73: Foxboro 56-1
lag 65: Foxboro adjustable restrictor lag — B102RP
analyzer ratio computer 61: Applied Automation, Inc., Model 102 Analyzer
transducer 63: Fisher 1/P transducer 546
valves 83 and 58: Fisher control valve (air to open)

The valve 40 was not employed as the air source was a turbine-driven compressor with the turbine speed being regulated responsive to the compressed air pressure to maintain a constant discharge pressure. The value of 2.3 was selected for the desired ratio of hydrogen sulfide to sulfur dioxide in conduit 32. This value of 2.3 was represented by a pnuematic pressure of 12.3 psig. Regulator 69 was adjusted to provide a pnuematic signal 68 representative of a minimum ratio of 1.8. The gain G of analog unit 73 was set at 135. The integration time in lag 65 was set at 6 minutes.

In one embodiment of the invention, it was desirable to feed the sour gas through conduit 11 at the maximum rate available. The output signal 51 was isolated from flow controller 52 by means of an auto-manual selector switch, and the setpoint of flow controller 52 was manually biased to maintain valve 58 at the fully opened condition, thereby effectively negating the function of high select relay 45. The same effect could have been achieved by simply omitting high select relay 45, flow controller 52 and value 58. The sour gas was passed through conduit 11 as available, while flow controller 81 regulated the air flow rate responsive to the lower of the sour gas pressure signal 44 and the analog unit output signal 77, thereby maintaining the desired ratio of hydrogen sulfide to oxygen entering boiler 12.

Reasonable variations and modifications are possible within the scope of the foregoing disclosure, the drawing and the appended claims to the invention.

That which is claimed is:

1. Apparatus for the production of sulfur comprising means defining a combustion chamber, first conduit means for passing a first stream containing hydrogen sulfide into said combustion chamber, second conduit means for passing a second stream containing oxygen into said combustion chamber to therein convert a portion of the hydrogen sulfide of said first stream to sulfur dioxide, a reactor, third conduit means for withdrawing the resulting combustion products from said combustion chamber and passing the withdrawn combustion products to said reactor, fourth conduit means for withdrawing the reaction effluent from said reactor, means for separating the thus withdrawn reaction effluent into a liquid sulfur stream and a stripped gas stream, means for measuring the pressure of said first stream and establishing a first signal representative thereof, means for measuring the flow rate of said first stream and establishing a second signal representative thereof, means for determining the ratio of the concentration of hydrogen sulfide in said stripped gas stream to the concentration of sulfur dioxide in said stripped gas stream and establishing a third signal representative thereof, means for establishing a fourth signal responsive to said second and third signals, and means for controlling the rate of flow of said second stream responsive to the lower of said first and fourth signals to maintain the desired ratio of hydrogen sulfide to oxygen fed to said combustion chamber despite any changes in the pressure of said first stream and any variation in the concentration of hydrogen sulfide in said first stream and in the concentration of oxygen in said second stream.

2. Apparatus in accordance with claim 1 further comprising means for measuring the flow rate of said second stream and establishing a fifth signal representative thereof, and means for controlling the flow rate of said first stream responsive to the higher of said first and fifth signals.

3. Apparatus in accordance with claim 2 wherein said means for establishing a fourth signal comprises means for establishing a sixth signal representative of the desired ratio of the concentration of hydrogen sulfide in said stripped gas stream to the concentration of sulfur dioxide in said stripped gas stream, means for establishing a seventh signal responsive to the difference between said third signal and said sixth signal, and means for producing said fourth signal responsive to the algebraic sum of said second signal and said seventh signal.

4. Apparatus in accordance with claim 3 wherein said means for determining the ratio and establishing a third signal comprises means for establishing an eighth signal proportional to the determined ratio of the concentration of hydrogen sulfide in said stripped gas stream to the concentration of sulfur dioxide in said stripped gas stream, and lag means for producing said third signal as a lagged function of said eighth signal.

5. Apparatus in accordance with claim 4 further comprising means for maintaining the pressure of said second stream substantially constant.

6. Apparatus in accordance with claim 2 wherein said means for establishing a fourth signal comprises means for establishing a sixth signal representative of the desired ratio of concentration of the hydrogen sulfide in said stripped gas stream to the concentration of sulfur dioxide in said stripped gas stream, an analog device having the function $P = B + K(A - C)$ wherein $P$ is said fourth signal, $B$ is said second signal, $A$ is said third signal, $C$ is said sixth signal and $K$ is a constant, and means for applying said second, third and sixth signals to said analog device.

7. Apparatus in accordance with claim 6 wherein said means for establishing a third signal comprises an analyzer-computing means for analyzing a sample of said stripped gas stream to determine the concentration of hydrogen sulfide and of sulfur dioxide therein and to produce a seventh signal proportional to the ratio of the determined concentration of hydrogen sulfide in said stripped gas stream to the determined concentration of sulfur dioxide in said stripped gas stream, and lag means for producing said third signal as a lagged function of said seventh signal.

8. Apparatus in accordance with claim 1 wherein said means for establishing a fourth signal comprises means for establishing a fifth signal representative of the desired ratio of the concentration of the hydrogen sulfide in said stripped gas stream to the concentration of sulfur dioxide in said stripped gas stream, an analog device having the function $P = B + K(A - C)$ wherein $P$ is said fourth signal, $B$ is said second signal, $A$ is said third signal, $C$ is said fifth signal and $K$ is a constant, and means for applying said second, third and fifth signals to said analog device.

9. Apparatus in accordance with claim 1 wherein said means for establishing a third signal comprises an analyzer-computing means for analyzing a sample of said stripped gas stream to determine the concentration of hydrogen sulfide and of sulfur dioxide therein and to produce a fifth signal proportional to the ratio of the determined concentration of hydrogen sulfide in said stripped gas stream to the determined concentration of sulfur dioxide in said stripped gas stream, and lag means for producing said third signal as a lagged function of said fifth signal.

10. Apparatus in accordance with claim 1 wherein said means for establishing a fourth signal comprises means for establishing a fifth signal representative of the desired ratio of the concentration of hydrogen sulfide in said stripped gas stream to the concentration of sulfur dioxide in said stripped gas stream, means for establishing a sixth signal responsive to the difference between said third signal and said fifth signal, and means for producing said fourth signal responsive to the algebraic sum of said second signal and said sixth signal.

* * * * *